United States Patent
Li et al.

(10) Patent No.: US 11,461,315 B2
(45) Date of Patent: Oct. 4, 2022

(54) BATCH JOB PERFORMANCE IMPROVEMENT IN ACTIVE-ACTIVE ARCHITECTURE

(71) Applicant: International Business Machines Corporation, Armonk, NY (US)

(72) Inventors: Shuo Li, Beijing (CN); Xiaobo Wang, Beijing (CN); Jia Tian Zhong, Beijing (CN); Sheng Yan Sun, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 42 days.

(21) Appl. No.: 17/110,523

(22) Filed: Dec. 3, 2020

(65) Prior Publication Data

US 2022/0179852 A1    Jun. 9, 2022

(51) Int. Cl.
*G06F 16/242* (2019.01)
*G06F 16/28* (2019.01)

(52) U.S. Cl.
CPC ...... *G06F 16/2433* (2019.01); *G06F 16/2423* (2019.01); *G06F 16/284* (2019.01)

(58) Field of Classification Search
CPC . G06F 16/2433; G06F 16/2423; G06F 16/284
See application file for complete search history.

(56) References Cited

U.S. PATENT DOCUMENTS

| | | | |
|---|---|---|---|
| 8,903,779 B1 * | 12/2014 | Holenstein | G06F 11/1469 707/685 |
| 10,296,632 B2 | 5/2019 | Park | |
| 2011/0295801 A1 * | 12/2011 | Dias | G06F 16/20 707/622 |

(Continued)

FOREIGN PATENT DOCUMENTS

| | | |
|---|---|---|
| CN | 104809199 A | 7/2015 |
| CN | 109101364 A | 12/2018 |
| CN | 109960710 A | 7/2019 |
| CN | 110334156 A | 10/2019 |
| CN | 111352766 A | 6/2020 |
| CN | 111666144 A | 9/2020 |
| CN | 111953808 A | 11/2020 |

OTHER PUBLICATIONS

"Patent Cooperation Treaty PCT International Search Report", Applicant's File Reference: PF210860PCT, International Application No. PCT/CN2021/131196, International Filing Date: Nov. 17, 2021, dated Jan. 6, 2022, 10 pages.

*Primary Examiner* — Cam Y T Truong
(74) *Attorney, Agent, or Firm* — Stephanie L. Carusillo (57) ABSTRACT

In an approach for improving performance of a batch job running on database servers in an active-active architecture. A processor, responsive to a batch job being ready to be executed on a source database server, sends a first communication to a target database server with a synchronization start point. While executing the batch job, a processor utilizes a pre-lock function, pre-load function, and lock avoidance function to prevent lock conflicts. A processor, responsive to either the source database server or the target database server encountering a commit statement, suspends the respective database server and sends a second communication to ask if the other respective database server is ready to complete the commit statement. A processor, responsive to the other respective database server confirming its ready to complete the commit statement, completes the commit statement on both the source database server and the target database server.

24 Claims, 5 Drawing Sheets

(56) References Cited

U.S. PATENT DOCUMENTS

| | | | |
|---|---|---|---|
| 2013/0046802 A1* | 2/2013 | Nemoto | G06F 16/119 707/823 |
| 2013/0066948 A1* | 3/2013 | Colrain | H04L 67/01 709/203 |
| 2020/0012520 A1 | 1/2020 | Bidkar | |
| 2020/0026786 A1 | 1/2020 | Cadarette | |
| 2020/0159578 A1 | 5/2020 | Sura | |
| 2020/0349037 A1 | 11/2020 | Landman | |

* cited by examiner

BATCH JOB PERFORMANCE IMPROVEMENT IN ACTIVE-ACTIVE ARCHITECTURE

BACKGROUND OF THE INVENTION

The present invention relates generally to the field of data synchronization on database servers, and more particularly to improving performance of a batch job running on database servers in an active-active architecture.

Active-active architecture is popular for a Distribute Relational Database Service that uses multiple database servers. The active-active architecture uses a pair of database servers—a source server and target server, with the target server being the back-up for the source server. Data can be read and/or written from/to both servers. The active-active architecture guarantees high availability of data access when one server is down.

A batch job is a computer program or set of programs processed in batch mode. This means that a sequence of commands, i.e., multiple Structured Query Language (SQL) statements, to be executed by the operating system is listed in a file (often called a batch file, command file, job script, or shell script) and submitted for execution as a single unit.

SUMMARY

Aspects of an embodiment of the present invention disclose a method, computer program product, and computer system for improving performance of a batch job running on database servers in an active-active architecture.

A processor, responsive to a batch job being ready to be executed on a source database server in an active-active environment, sends a first communication, between the source database server and a target database server, with a synchronization start point of when to start executing the batch job on both the source database server and the target database server. A processor executes the batch job on both the source database server and the target database server beginning at the synchronization start point. A processor, responsive to either the source database server or the target database server encountering a commit statement for a unit of the batch job, suspends the respective database server that encountered the commit statement. A processor sends a second communication, between the source database server and the target database server, to ask if the other respective database server is ready to complete the commit statement. A processor, responsive to the other respective database server confirming that the other respective database server is ready to complete the commit statement, completes the commit statement on both the source database server and the target database server.

In some aspects of an embodiment of the present invention, a processor, responsive to encountering a lock conflict on either the source database server or the target database server, sends a communication to the other respective database server that did not encounter the lock conflict to suspend operation.

In some aspects of an embodiment of the present invention, a processor, responsive to encountering an SQL error on either the source database server or the target database server, sends a communication to the other respective database server that did not encounter the SQL error to suspend operation.

In some aspects of an embodiment of the present invention, a processor performs, asynchronously across the source database server and the target database server, a pre-lock function for each update statement and each delete statement in the batch job using a table-scan access method. The pre-lock function using the table-scan access method comprises: in parallel to a main task of an operation locking rows to be modified by the operation on a first page, scanning each page after the first page for the rows to be modified by the operation; locking the rows to be modified on each page after the first page; and responsive to determining a number of rows to be locked within a page exceeds a pre-set threshold, acquiring a page lock for the page.

In some aspects of an embodiment of the present invention, a processor performs, asynchronously across the source database server and the target database server, a pre-lock function for each update statement and each delete statement in the batch job using an index-only access method. The pre-lock function using the index-only access method comprises: in parallel to a main task of an operation locking rows to be modified by the operation on a first page using an index, finding the rows to be modified by the operation on each page after the first page using information in an index entry, wherein each index entry includes a key value and a row identifier (ID), wherein the row ID includes a partition number, a data page number, and a slot number, and wherein the data page number is used to locate and determine how many rows are to be modified on each page; locking the rows to be modified on each page after the first page; and responsive to determining a number of rows to be locked within a page exceeds a pre-set threshold based on a number of data page number entries for the page, acquiring a page lock for the page.

In some aspects of an embodiment of the present invention, a processor performs, asynchronously across the source database server and the target database server, a pre-lock function for each update statement and each delete statement in the batch job using a normal index access method. The pre-lock function using the normal index access method comprises: in parallel to a main task of an operation locking rows to be modified by the operation on a first page using an index, finding the rows to be modified by the operation on each page after the first page based on information in an index entry and then applying an additional predicate included in the operation to determine which row or page lock to acquire, wherein each index entry includes a key value and a row identifier (ID), wherein the row ID includes a partition number, a data page number, and a slot number, and wherein the data page number is used to locate and determine how many rows are to be modified on each page; acquiring a page level lock for each page after the first page with the rows to be modified; and responsive to determining a number of rows to be locked within a page does not exceed a pre-set threshold based on the data page number in each index entry, downgrading the page level lock to row level locks.

In some aspects of an embodiment of the present invention, a processor performs, asynchronously across the source database server and the target database server, a pre-load function for each insert statement in the batch job. The pre-load function comprises: in parallel to a main task of an operation fetching a first set of rows, pre-loading a second set of rows by locating a set of leaf pages to be used to save the second set of rows using an index, wherein the leaf pages are defined on a table being inserted by the operation.

In some aspects of an embodiment of the present invention, a processor, responsive to encountering a select statement in the batch job, performs, asynchronously across the source database server and the target database server, a lock avoidance function. The lock avoidance function comprises:

building an image of active unit recovery (UR) identifications (IDs) of the batch job, wherein the image includes a low boundary and a high boundary of the active UR IDs; responsive to reading a row with a UR ID within the low boundary and the high boundary of the image, tracing back a log record of the row until a version of the row is found with a respective UR ID that is below the low boundary; and executing the select statement without a lock using the version of the row with the respective UR ID that is below the low boundary.

DETAILED DESCRIPTION

Embodiments of the present invention recognize that active-active architectures are widely used in the database area, but data performance is sacrificed due to the data synchronization that needs to occur between a source server and a target server. Data performance is even worse when a batch jobs is executed. Data that is being modified or read by an operation, such as SELECT, INSERT, UPDATE, or DELETE operations, but has not been committed and is invisible, i.e., inaccessible for use, so the longer it takes the data to be committed, the longer the data is invisible and inaccessible.

Figure 1:
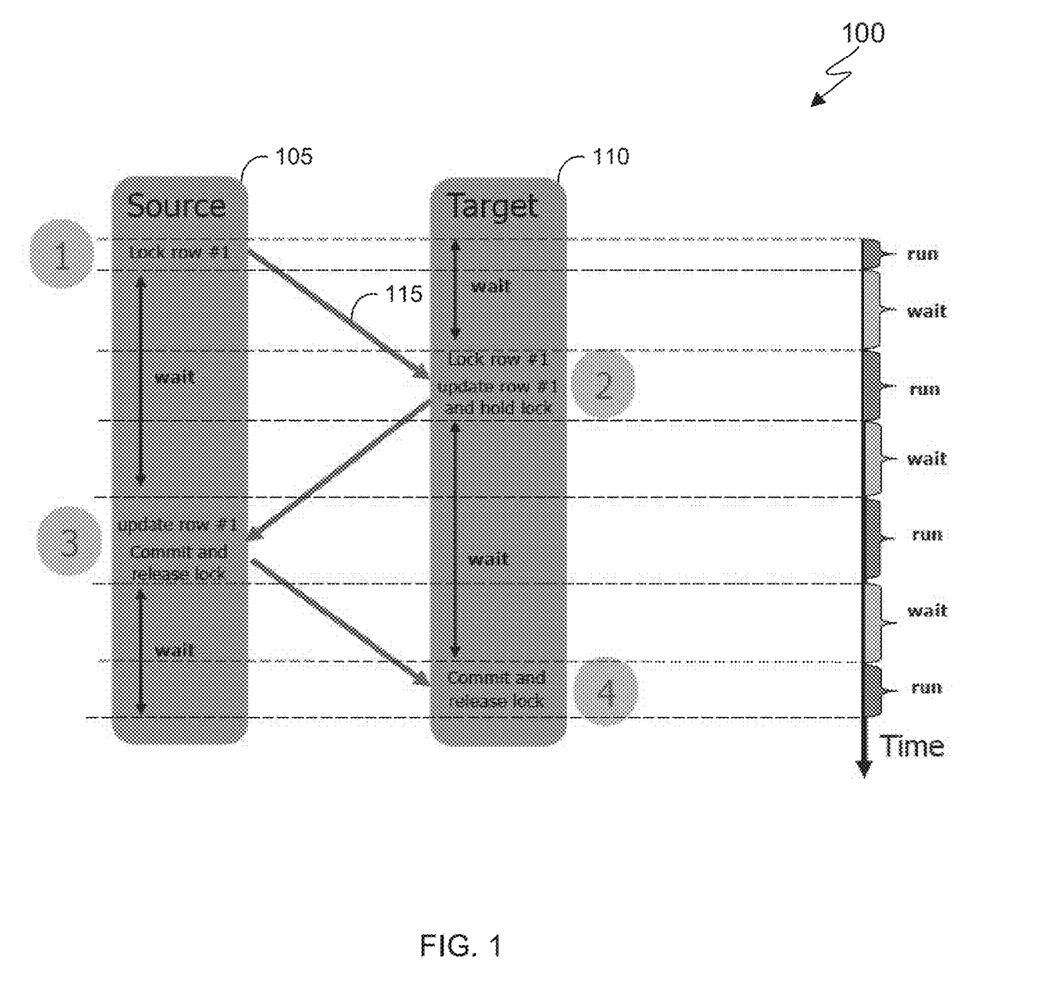
FIG. 1 is a functional flow diagram illustrating how an SQL statement is executed between database servers in an active-active architecture, in accordance with prior art.

FIG. 1 is functional flow diagram 100 illustrating how a job is executed between database servers in an active-active architecture, in accordance with prior art. To accomplish a single commit to modify a single row of data, there are three communications 115 that need to occur between a source server 105 and a target server 110, shown by the three arrows between the source and the target, that causes slow performance and wastes the system's resources during the "wait" periods.

One current solution for batch jobs, which require modification of multiple rows of data, requires the same three communications to occur to perform a "block" modification operation, which entails performing the same four steps (1-4) shown in FIG. 1 but performing each step on the "block of rows" involved in the batch job. Even though there are still the same three communications between the source server and the target server, there are three drawbacks to this current solution for batch jobs: (1) extended wait times between the three communications to allow for the "block of rows" to be modified and committed between the source server and the target server; (2) an increased probability of a lock conflict occurring; and (3) cannot take full advantage of system resource due to this serial operation. Thus, embodiments of the present invention recognize the need to cut down on wait times during this data synchronization process for database servers in an active-active architecture to improve data performance.

Embodiments of the present invention provide a system and method for improving data performance for batch jobs run on database servers in an active-active architecture by performing a batch data modification operation on both a source server and target server simultaneously to minimize necessary communications between the source server and the target server. Embodiments of the present invention further provide a system and method for improving data performance for database servers in an active-active architecture by pre-locking and/or pre-loading data involved in an upcoming modification operation to prevent a lock conflict, which in turn will lower down time (i.e., suspend time) due to the lock conflict and reduce the possibility of a rollback being needed due to the lock conflict. Embodiments of the present invention further provide a system and method for improving data performance for database servers in an active-active architecture by avoiding a lock requirement for a read, i.e., SELECT, operation.

Implementation of embodiments of the invention may take a variety of forms, and exemplary implementation details are discussed subsequently with reference to the FIGS. 2-5.

Figure 2:
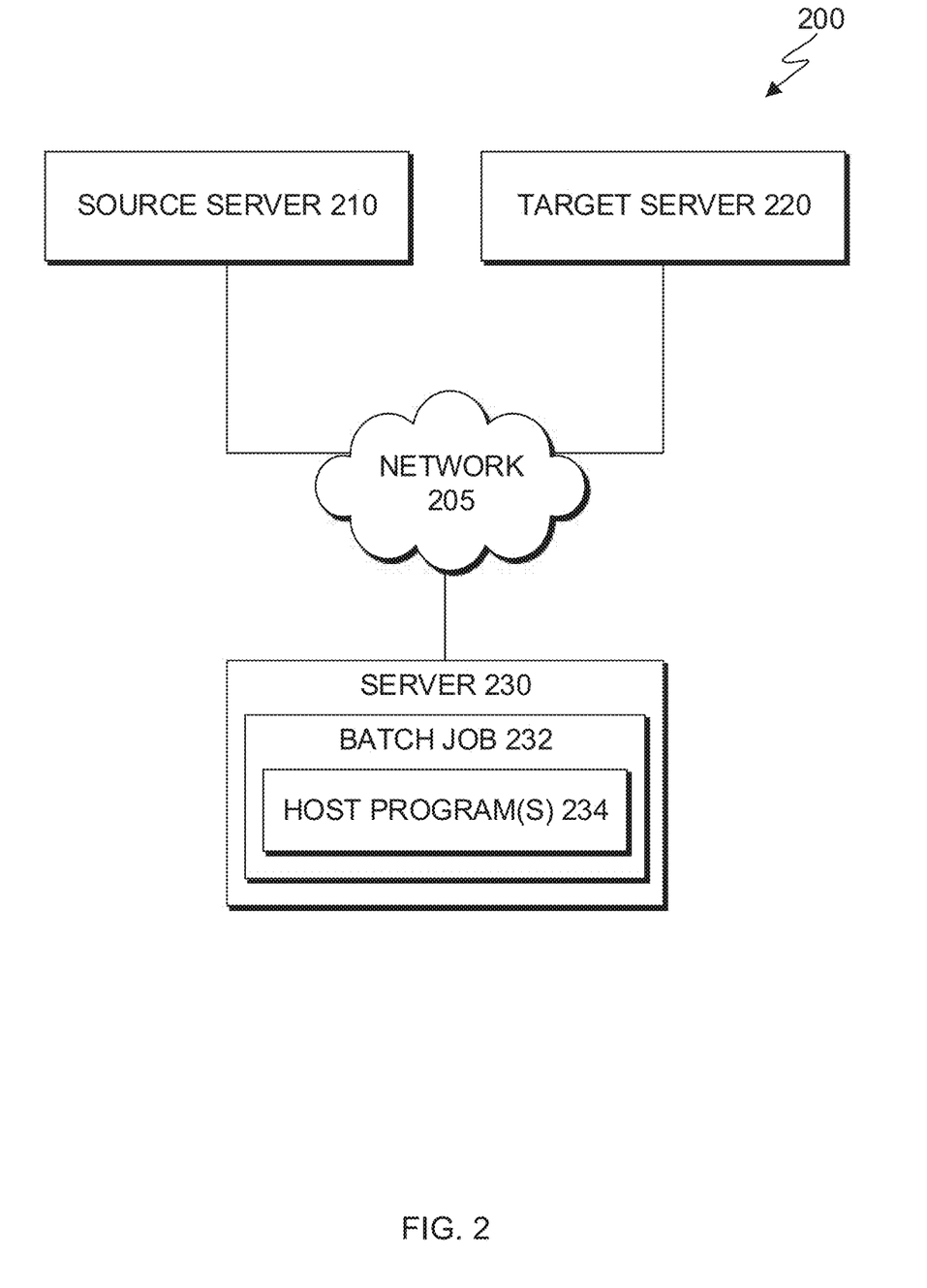
FIG. 2 is a functional block diagram illustrating a distributed data processing environment, in accordance with an embodiment of the present invention.

FIG. 2 depicts a functional block diagram illustrating a distributed data processing environment, generally designated 200, in accordance with one embodiment of the present invention. The term "distributed," as used herein, describes a computer system that includes multiple, physically distinct devices that operate together as a single computer system. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 200 includes source server 210, target server 220, and server 230 interconnected over network 205. Network 205 can be, for example, a telecommunications network, a local area network (LAN), a wide area network (WAN), such as the Internet, or a combination of the three, and can include wired, wireless, or fiber optic connections. Network 205 can include one or more wired and/or wireless networks capable of receiving and transmitting data, voice, and/or video signals, including multimedia signals that include voice, data, and video information. In general, network 205 can be any combination of connections and protocols that will support communications between source server 210, target server 220, server 230, and other computing devices (not shown) within distributed data processing environment 200.

Source server 210 and target server 220 operate as database servers in an active-active architecture with target server 220 being a back-up to source server 210. In an embodiment, source server 210 and target server 220 can each be a standalone computing device, a management server, a web server, or any other electronic device or computing system capable of receiving, sending, and processing data. In an embodiment, source server 210 and target server 220 represent a computing system utilizing clustered computers and components (e.g., database server computers, application server computers, etc.) that act as a single pool of seamless resources when accessed within distributed data processing environment 200. Source server 210 and target server 220 may include internal and external hardware components, as depicted and described in further detail with respect to FIG. 5.

Server 230 can be a standalone computing device, a management server, a web server, a mobile computing device, or any other electronic device or computing system capable of receiving, sending, and processing data. In other embodiments, server 230 can represent a server computing system utilizing multiple computers as a server system, such as in a cloud computing environment. In another embodiment, server 230 can be a laptop computer, a tablet computer, a netbook computer, a personal computer (PC), a desktop computer, a personal digital assistant (PDA), a smart phone, or any programmable electronic device capable of communicating with source server 210, target server 220, and other computing devices (not shown) within distributed data processing environment 200 via network 205. In another embodiment, server 230 represents a computing system utilizing clustered computers and components (e.g., database server computers, application server computers, etc.) that act as a single pool of seamless resources when accessed within distributed data processing environment 200. In the depicted embodiments, server 230 includes batch job 232. Server 230 may include internal and external hardware components, as depicted and described in further detail with respect to FIG. 5.

Figure 3:
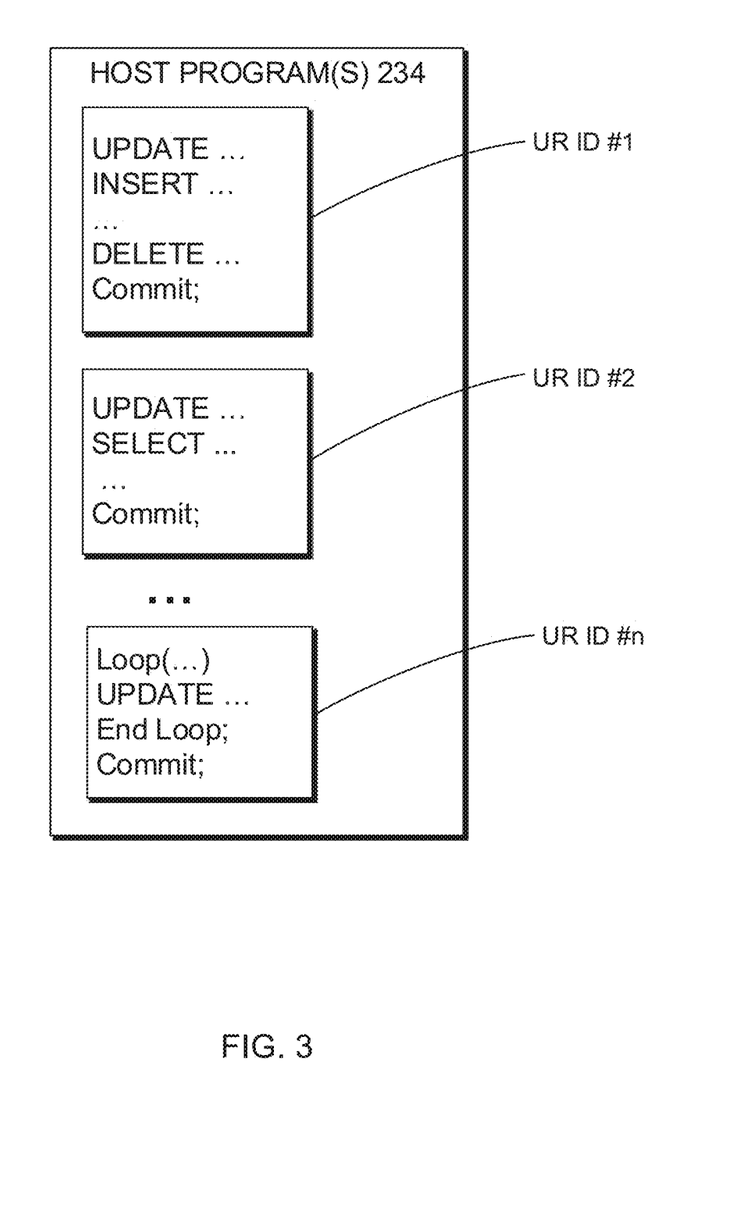
FIG. 3 is a block diagram illustrating units of a host program, in accordance with an embodiment of the present invention.

Batch job 232 is a computer program or set of programs (i.e., host program(s) 234) processed in batch mode. Batch job 232 consists of a sequence of commands, i.e., multiple Structured Query Language (SQL) statements, embedded in host program(s) 234 that are submitted for execution on the database servers as a single unit. Host program(s) 234 is host language code logic that contains an n number of units designated as unit recovery identification #n (UR ID #n), in which n represents a positive integer between 1 and any number of units that exists in host program 234. A unit represents a section of code logic that comprises an SQL statement (e.g., SELECT, UPDATE, DELETE, INSERT, etc.) and ends with a COMMIT command denoting that the data has been committed. For example, host program 234 may contain host language code logic as shown in FIG. 3 with n units designated as UR ID #1, UR ID #2, . . . and UR ID #n.

Figure 4:
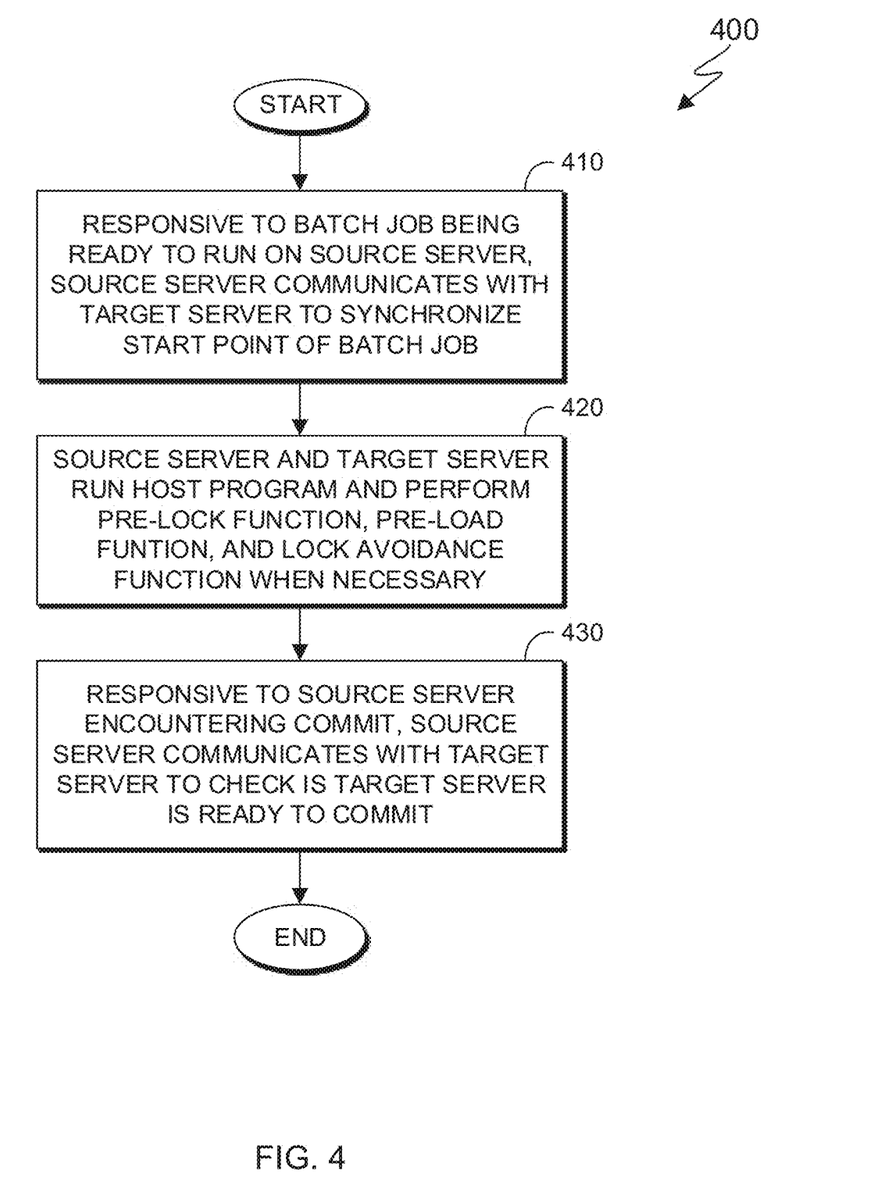
FIG. 4 is a flowchart depicting operational steps of a data synchronization method, for improving performance of a batch job running on database servers in an active-active architecture, in accordance with an embodiment of the present invention.

FIG. 4 is a flowchart 400 depicting operational steps of a data synchronization method, for improving performance of a batch job running on a source server and a target server in an active-active architecture, in accordance with an embodiment of the present invention. In an embodiment, a data modification operation is performed on both a source server and a target server simultaneously while utilizing a pre-lock function, a pre-load function, and a lock avoidance function, as necessary to avoid lock conflicts. It should be appreciated that the process depicted in FIG. 4 illustrates one possible iteration of the data synchronization method, which may be repeated for each batch job received by the source server.

In step 410, responsive to a batch job being ready to be executed on the source server, the source server sends a communication to the target server to synchronize the batch job start point on both the source server and the target server. In an embodiment, the source server sends a first communication to the target server to ask if the target server is ready to run the batch job and waits for the target server to confirm that the target server is ready to run the batch job. In an embodiment, the source server sends a synchronization start point in the first communication of when to start executing the batch job on both the source server and the target server.

In step 420, the source server and target server begin to run the batch job at the synchronized start point. In an embodiment, the source server and target server run the batch job by locking rows or pages that are involved in the data modification operation for each unit of the batch job. If a lock conflict occurs on either the source server or the target server, the server with the lock conflict suspends until the server can acquire the necessary lock. The server with the lock conflict sends a message to the other server to suspend until a lock can be acquired. The other server will send a message confirming the suspend. If a lock is not acquired in time, the server with the lock conflict performs a rollback and sends a message to the other server to perform the same rollback. The other server will send a message confirming the rollback. If an SQL code error occurs on either the source server or the target server, the server with the SQL code error performs a rollback and sends a message to the other server to perform the same rollback. The other server will send a message confirming the rollback.

While the batch job is running, to help avoid lock conflicts from occurring, this method employs a pre-lock function and/or a pre-load function, when necessary, asynchronously across the source server and target server. The pre-lock function is deployed for UPDATE or DELETE operations encountered, which are similar because the rows of data already exist. The pre-load function is deployed for INSERT operations encountered, in which the rows being modified do not exist yet.

For the pre-lock function, there are two possible access methods to check the rows and/or pages one by one for the rows that are being modified by the operation. The first access method is a table-scan and the second access method is an index-scan. Using the table-scan method, the servers asynchronously perform the pre-lock function against rows to be modified by the operation using a mixed lock mechanism, which will help to improve performance. While the main task of the operation begins at the first page and begins to lock rows to be modified, a sub-task uses table-scan to scan every page after the first page for rows to be modified by the operation and lock the rows to be modified. When a number of rows to be locked within the same page exceed a pre-set threshold, e.g., 50% or more of the rows on the same page, the sub-task will escalate the multiple rows lock to a page lock. A special pre-lock area within a buffer pool will be built up to avoid over-flush.

Using the index-scan method, there are two types that can be used: (1) index-only access and (2) normal index access. For index-only access, the servers asynchronously perform the pre-lock function against rows to be modified with row level lock or page level lock according to key range and row IDs. Again, while the main task of the operation begins at the first page and begins to lock rows to be modified using the index (i.e., binary index tree) to find the necessary rows on the first page, a sub-task uses the index to find the rows to be modified by the operation on every page after the first page to lock rows to be modified or lock a page if a pre-set threshold of rows are to be modified on the page. The index-only access decides whether rows will be modified and require a lock without accessing the pages, but by looking for location information in an index entry. An index entry format consists of a key value and a row ID, in which the row ID contains a partition number, a data page number, and a slot number, in which the data page number is used to locate and determine how many rows are to be modified. A page lock is used if there are more than a pre-set threshold number of data page number entries for a certain page.

For normal index access, the servers asynchronously perform the pre-lock function against rows to be modified with page level lock at the beginning according to key ranges and row IDs, then downgrade to row level lock appropriately when a number of rows being modified within a same page is lower than a pre-set threshold. This access method is used when an additional predicate is included in the operation. Again, while the main task of the operation begins at the first page and begins to lock rows to be modified using the index (i.e., binary index tree) to find the necessary rows on the first page, a sub-task uses the index to find the rows to be modified by the operation on every page after the first page. To determine if a row qualifies, the sub-task uses the index and then applies the additional predicate to determine which row or page lock to acquire. The normal index access decides whether rows will be modified and require a lock without accessing the pages, but by looking for location information in an index entry. An index entry format consists of a key value and a row ID, in which the row ID contains a partition number, a data page number, and a slot number, in which the data page number is used to locate and determine how many rows are to be modified.

For the pre-load function deployed for INSERT operations encountered, the servers asynchronously perform the pre-load function against leaf pages of an index, which are defined on the table being inserted by the INSERT operation, and calculate a position (i.e., slot) of an insert key. While a main task fetches a first set of rows (e.g., 10 rows) using the index to locate a position, and insert the rows, a sub task, which runs in parallel to the main task, pre-loads (i.e., fetches) a second set of rows (e.g., 10 rows). The sub-task locates which index leaf pages will be used to save rows and performs page load operations. The sub-task pre-loads the leaf pages for the main task to use directly.

While the batch job is running, to avoid a lock requirement entirely for a SELECT operation (i.e., a read operation), this method employs a lock avoidance function, when necessary, asynchronously across the source server and target server. When a SELECT operation is encountered, the lock avoidance function builds an image composed of active UR IDs, in which an active UR ID is one that has not committed yet and therefore cannot be read. The image is a timeline of UR IDs showing which UR IDs have already been committed, are active, and have not yet begun. The image includes a low boundary and a high boundary of active UR IDs. The lock avoidance function utilizes a new format for a record for a row that along with a row value also includes a UR ID and a log buffer pointer. When a row is read, the image of the active UR IDs is utilized to see if the UR ID of the current row is within the boundary of active UR IDs. If the UR ID of the current row is less than the low boundary, the value of the row is visible to the SELECT statement.

If the UR ID of the current row is within the boundary of active UR IDs, the lock avoidance function traces back the log record against the current row one by one until an appropriate UR ID is found that is no longer active. For example, if the row value is #3, the UR ID of the current row is 18, and the image shows that UR IDs 10-20 are active, then the lock avoidance function uses the log buffer pointer to trace back to find the previous version of the row (row value #2) with a UR ID of 14, so then the log buffer pointer for that version of the row is used to trace back to the second previous version of that row (row value #1) which has a UR ID of 7, which is out of the active range, so that second previous version of the row can be read.

If the UR ID of the current row is within the boundary of active UR IDs but the UR ID cannot be found within the image, this means the current row has been committed prior to building the UR ID image and is still visible to current read operation. This may occur when the UR is a short unit that committed quickly. The lock avoidance function improves performance by avoiding the need to acquire a share lock when a SELECT statement is encountered.

In step 430, responsive to the source server encountering a "commit" statement for a unit of the batch job, the source server communicates with the target server to see if the target server is ready to complete the commit statement and suspends until the target server confirms it is ready to commit. Once the target server communicates back with the source server to confirm that the target server is ready to commit, then both the source server and the target server complete the commit. In other embodiments, responsive to the target server encountering a "commit" statement for a unit of the batch job, the target server communicates with the source server to see if the source server is ready to complete the commit statement and suspends until the source server confirms it is ready to commit. Once the source server communicates back with the target server to confirm that the source server is ready to commit, then both the source server and the target server complete the commit.

Embodiments of the present invention utilize this data synchronization method to improve performance of a batch job running on a source server and a target server in an active-active architecture. A performance test was done to compare current logic for running a batch job in an active-active architecture versus a single server architecture against new logic of the data synchronization method for running a batch job in an active-active architecture versus a single server architecture. The performance test for the current logic showed a 51.43% performance increase, while the new logic showed a performance increase of 89.62%.

Figure 5:
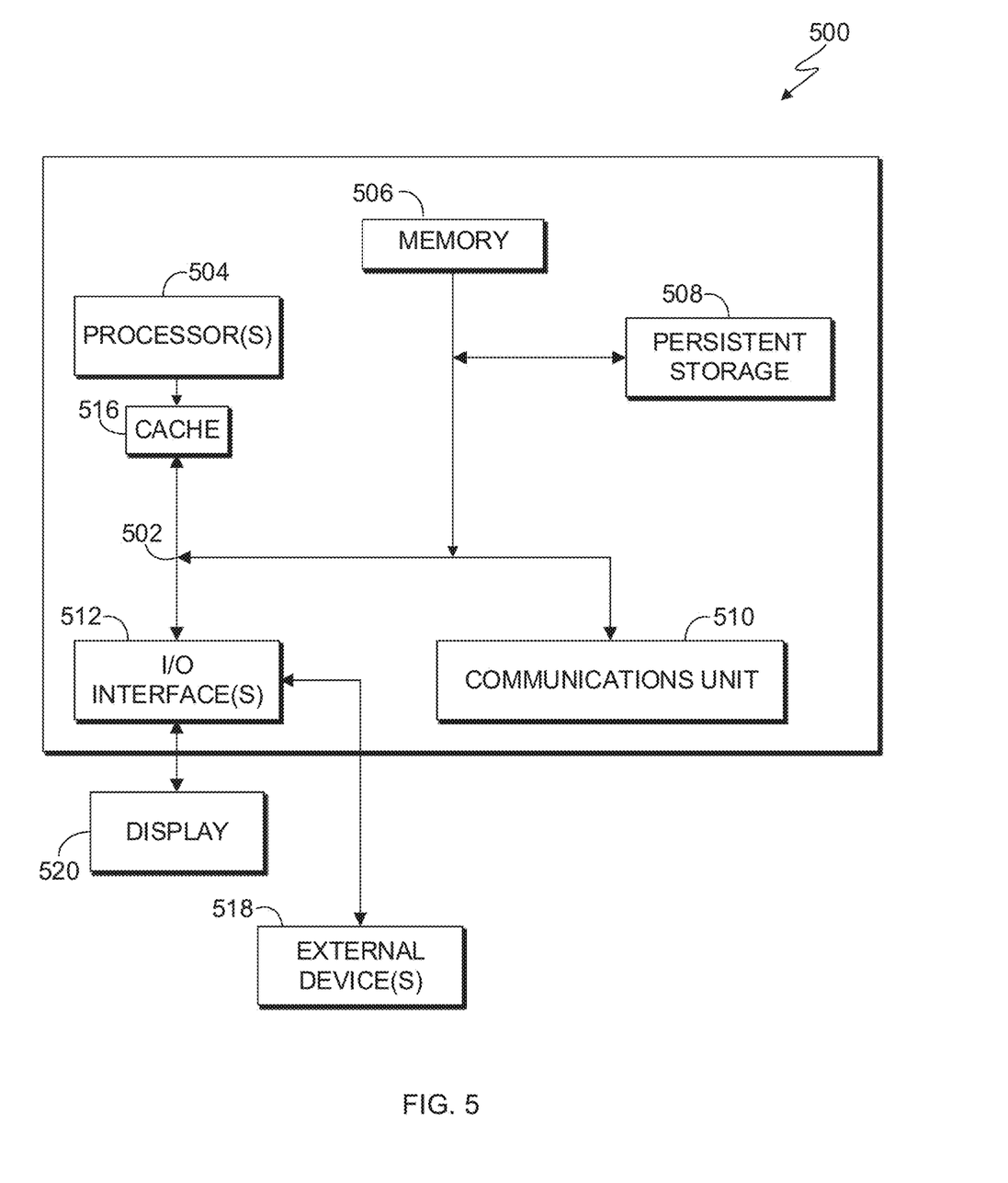
FIG. 5 depicts a block diagram of components of a server of the distributed data processing environment of FIG. 2, in accordance with an embodiment of the present invention.

FIG. 5 depicts a block diagram of components of computing device 500, suitable for server 230 within distributed data processing environment 200 of FIG. 2, in accordance with an embodiment of the present invention. It should be appreciated that FIG. 5 provides only an illustration of one implementation and does not imply any limitations with regard to the environments in which different embodiments can be implemented. Many modifications to the depicted environment can be made.

Computing device 500 includes communications fabric 502, which provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of computer processor(s) 504 by holding recently accessed data, and data near accessed data, from memory 506.

Programs may be stored in persistent storage 508 and in memory 506 for execution and/or access by one or more of the respective computer processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Programs may be downloaded to persistent storage 508 through communications unit 510.

I/O interface(s) 512 allows for input and output of data with other devices that may be connected to server 230. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

Programs described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    responsive to a batch job being ready to be executed on a source database server in an active-active environment, sending, by one or more processors, a first communication, between the source database server and a target database server, with a synchronization start point of when to start executing the batch job on both the source database server and the target database server;
    executing, by the one or more processors, the batch job on both the source database server and the target database server beginning at the synchronization start point;
    responsive to either the source database server or the target database server encountering a commit statement for a unit of the batch job, suspending, by the one or more processors, either the source database server or the target database server that encountered the commit statement;
    sending, by the one or more processors, a second communication, between the source database server and the target database server, to ask if either the source database server or the target database server that did not encounter the commit statement is ready to complete the commit statement; and
    responsive to either the source database server or the target database server confirming that either the source database server or the target database server is ready to complete the commit statement, completing, by the one or more processors, the commit statement on both the source database server and the target database server.

2. The computer-implemented method of claim 1, further comprising:
    responsive to encountering a lock conflict on either the source database server or the target database server, sending, by the one or more processors, a communication to either the source database server or the target database server that did not encounter the lock conflict to suspend operation.

3. The computer-implemented method of claim 1, further comprising: responsive to encountering a Structure Query Language (SQL) error on either the source database server or the target database server, sending, by the one or more processors, a communication to either the source database server or the target database server that did not encounter the SQL error to suspend operation.

4. The computer-implemented method of claim 1, further comprising:
    performing, by the one or more processors, asynchronously across the source database server and the target database server, a pre-lock function for each update statement and each delete statement in the batch job using a table-scan access method, wherein the pre-lock function using the table-scan access method comprises:
        in parallel to a main task of an operation locking rows to be modified by the operation on a first page, scanning, by the one or more processors, each page after the first page for the rows to be modified by the operation;
        locking, by the one or more processors, the rows to be modified on each page after the first page; and
        responsive to determining a number of rows to be locked within a page exceeds a pre-set threshold, acquiring, by the one or more processors, a page lock for the page.

5. The computer-implemented method of claim 1, further comprising:
    performing, by the one or more processors, asynchronously across the source database server and the target database server, a pre-lock function for each update statement and each delete statement in the batch job using an index-only access method, wherein the pre-lock function using the index-only access method comprises:
        in parallel to a main task of an operation locking rows to be modified by the operation on a first page using an index, finding, by the one or more processors, the rows to be modified by the operation on each page after the first page using information in an index entry, wherein each index entry includes a key value and a row identifier (ID), wherein the row ID includes a partition number, a data page number, and a slot number, and wherein the data page number is used to locate and determine how many rows are to be modified on each page;

locking, by the one or more processors, the rows to be modified on each page after the first page; and responsive to determining a number of rows to be locked within a page exceeds a pre-set threshold based on a number of data page number entries for the page, acquiring, by the one or more processors, a page lock for the page.

6. The computer-implemented method of claim 1, further comprising:

performing, by the one or more processors, asynchronously across the source database server and the target database server, a pre-lock function for each update statement and each delete statement in the batch job using a normal index access method, wherein the pre-lock function using the normal index access method comprises:

in parallel to a main task of an operation locking rows to be modified by the operation on a first page using an index, finding, by the one or more processors, the rows to be modified by the operation on each page after the first page based on information in an index entry and then applying an additional predicate included in the operation to determine which row or page lock to acquire, wherein each index entry includes a key value and a row identifier (ID), wherein the row ID includes a partition number, a data page number, and a slot number, and wherein the data page number is used to locate and determine how many rows are to be modified on each page;

acquiring, by the one or more processors, a page level lock for each page after the first page with the rows to be modified; and responsive to determining a number of rows to be locked within a page does not exceed a pre-set threshold based on the data page number in each index entry, downgrading, by the one or more processors, the page level lock to row level locks.

7. The computer-implemented method of claim 1, further comprising:

performing, by the one or more processors, asynchronously across the source database server and the target database server, a pre-load function for each insert statement in the batch job, wherein the pre-load function comprises:

in parallel to a main task of an operation fetching a first set of rows, pre-loading, by the one or more processors, a second set of rows by locating a set of leaf pages to be used to save the second set of rows using an index, wherein the leaf pages are defined on a table being inserted by the operation.

8. The computer-implemented method of claim 1, further comprising:

responsive to encountering a select statement in the batch job, performing, by the one or more processors, asynchronously across the source database server and the target database server, a lock avoidance function, wherein the lock avoidance function comprises:

building, by the one or more processors, an image of active unit recovery (UR) identifications (IDs) of the batch job, wherein the image includes a low boundary and a high boundary of the active UR IDs;

responsive to reading a row with a UR ID within the low boundary and the high boundary of the image, tracing back, by the one or more processors, a log record of the row until a version of the row is found with a respective UR ID that is below the low boundary; and executing, by the one or more processors, the select statement without a lock using the version of the row with the respective UR ID that is below the low boundary.

9. A computer-implemented method comprising:

responsive to a batch job being ready to be executed on a source database server in an active-active environment, sending, by one or more processors, a first communication, between the source database server and a target database server, with a synchronization start point of when to start executing the batch job on both the source database server and the target database server;

executing, by the one or more processors, the batch job on both the source database server and the target database server beginning at the synchronization start point;

performing, by the one or more processors, asynchronously across the source database server and the target database server, a pre-lock function for each update statement and each delete statement in the batch job using a table-scan access method;

responsive to either the source database server or the target database server encountering a commit statement for a unit of the batch job, suspending, by the one or more processors, either the source database server or the target database server that encountered the commit statement;

sending, by the one or more processors, a second communication, between the source database server and the target database server, to ask if either the source database server or the target database server is ready to complete the commit statement; and responsive to either the source database server or the target database server confirming that either the source database server or the target database server is ready to complete the commit statement, completing, by the one or more processors, the commit statement on both the source database server and the target database server.

10. The computer-implemented method of claim 9, further comprising:

responsive to encountering a lock conflict on either the source database server or the target database server, sending, by the one or more processors, a communication to either the source database server or the target database server that did not encounter the lock conflict to suspend operation.

11. The computer-implemented method of claim 9, further comprising: responsive to encountering a Structure Query Language (SQL) error on either the source database server or the target database server, sending, by the one or more processors, a communication to either the source database server or the target database server that did not encounter the SQL error to suspend operation.

12. The computer-implemented method of claim 9, wherein the pre-lock function using the table-scan access method comprises:

in parallel to a main task of an operation locking rows to be modified by the operation on a first page, scanning, by the one or more processors, each page after the first page for the rows to be modified by the operation;

locking, by the one or more processors, the rows to be modified on each page after the first page; and responsive to determining a number of rows to be locked within a page exceeds a pre-set threshold, acquiring, by the one or more processors, a page lock for the page.

13. The computer-implemented method of claim 9, further comprising:
performing, by the one or more processors, asynchronously across the source database server and the target database server, a pre-load function for each insert statement in the batch job, wherein the pre-load function comprises:
in parallel to a main task of an operation fetching a first set of rows, pre-loading, by the one or more processors, a second set of rows by locating a set of leaf pages to be used to save the second set of rows using an index, wherein the leaf pages are defined on a table being inserted by the operation.

14. The computer-implemented method of claim 9, further comprising:
responsive to encountering a select statement in the batch job, performing, by the one or more processors, asynchronously across the source database server and the target database server, a lock avoidance function, wherein the lock avoidance function comprises:
building, by the one or more processors, an image of active unit recovery (UR) identifications (IDs) of the batch job, wherein the image includes a low boundary and a high boundary of the active UR IDs;
responsive to reading a row with a UR ID within the low boundary and the high boundary of the image, tracing back, by the one or more processors, a log record of the row until a version of the row is found with a respective UR ID that is below the low boundary; and
executing, by the one or more processors, the select statement without a lock using the version of the row with the respective UR ID that is below the low boundary.

15. A computer-implemented method comprising:
responsive to a batch job being ready to be executed on a source database server in an active-active environment, sending, by one or more processors, a first communication, between the source database server and a target database server, with a synchronization start point of when to start executing the batch job on both the source database server and the target database server;
executing, by the one or more processors, the batch job on both the source database server and the target database server beginning at the synchronization start point;
performing, by the one or more processors, asynchronously across the source database server and the target database server, a pre-lock function for each update statement and each delete statement in the batch job using an index-only access method;
responsive to either the source database server or the target database server encountering a commit statement for a unit of the batch job, suspending, by the one or more processors, either the source database server or the target database server that encountered the commit statement;
sending, by the one or more processors, a second communication, between the source database server and the target database server, to ask if either the source database server or the target database server is ready to complete the commit statement; and
responsive to either the source database server or the target database server confirming that either the source database server or the target database server is ready to complete the commit statement, completing, by the one or more processors, the commit statement on both the source database server and the target database server.

16. The computer-implemented method of claim 15, further comprising:
responsive to encountering a lock conflict on either the source database server or the target database server, sending, by the one or more processors, a communication to either the source database server or the target database server that did not encounter the lock conflict to suspend operation.

17. The computer-implemented method of claim 15, further comprising: responsive to encountering a Structure Query Language (SQL) error on either the source database server or the target database server, sending, by the one or more processors, a communication to either the source database server or the target database server that did not encounter the SQL error to suspend operation.

18. The computer-implemented method of claim 15, wherein the pre-lock function using the index-only access method comprises:
in parallel to a main task of an operation locking rows to be modified by the operation on a first page using an index, finding, by the one or more processors, the rows to be modified by the operation on each page after the first page using information in an index entry, wherein each index entry includes a key value and a row identifier (ID), wherein the row ID includes a partition number, a data page number, and a slot number, and wherein the data page number is used to locate and determine how many rows are to be modified on each page;
locking, by the one or more processors, the rows to be modified on each page after the first page; and
responsive to determining a number of rows to be locked within a page exceeds a pre-set threshold based on a number of data page number entries for the page, acquiring, by the one or more processors, a page lock for the page.

19. The computer-implemented method of claim 15, further comprising:
performing, by the one or more processors, asynchronously across the source database server and the target database server, a pre-load function for each insert statement in the batch job, wherein the pre-load function comprises:
in parallel to a main task of an operation fetching a first set of rows, pre-loading, by the one or more processors, a second set of rows by locating a set of leaf pages to be used to save the second set of rows using an index, wherein the leaf pages are defined on a table being inserted by the operation.

20. The computer-implemented method of claim 15, further comprising:
responsive to encountering a select statement in the batch job, performing, by the one or more processors, asynchronously across the source database server and the target database server, a lock avoidance function, wherein the lock avoidance function comprises:
building, by the one or more processors, an image of active unit recovery (UR) identifications (IDs) of the batch job, wherein the image includes a low boundary and a high boundary of the active UR IDs;
responsive to reading a row with a UR ID within the low boundary and the high boundary of the image, tracing back, by the one or more processors, a log record of the row until a version of the row is found with a respective UR ID that is below the low boundary; and executing, by the one or more processors, the select statement without a lock using the version of the row with the respective UR ID that is below the low boundary.

21. A computer program product comprising:
one or more computer readable storage media and program instructions collectively stored on the one or more computer readable storage media, the stored program instructions comprising:
program instructions to, responsive to a batch job being ready to be executed on a source database server in an active-active environment, send a first communication, between the source database server and a target database server, with a synchronization start point of when to start executing the batch job on both the source database server and the target database server;
program instructions to execute the batch job on both the source database server and the target database server beginning at the synchronization start point;
program instructions to, responsive to either the source database server or the target database server encountering a commit statement for a unit of the batch job, suspend either the source database server or the target database server that encountered the commit statement;
program instructions to send a second communication, between the source database server and the target database server, to ask if either the source database server or the target database server is ready to complete the commit statement; and
program instructions to, responsive to either the source database server or the target database server confirming that either the source database server or the target database server is ready to complete the commit statement, complete the commit statement on both the source database server and the target database server.

22. The computer program product of claim 21, further comprising:
program instructions to, responsive to encountering a lock conflict on either the source database server or the target database server, send a communication to either the source database server or the target database server that did not encounter the lock conflict to suspend operation.

23. A computer system comprising:
one or more computer processors;
one or more computer readable storage media;
program instructions collectively stored on the one or more computer readable storage media for execution by at least one of the one or more computer processors, the stored program instructions comprising:
program instructions to, responsive to a batch job being ready to be executed on a source database server in an active-active environment, send a first communication, between the source database server and a target database server, with a synchronization start point of when to start executing the batch job on both the source database server and the target database server;
program instructions to execute the batch job on both the source database server and the target database server beginning at the synchronization start point;
program instructions to, responsive to either the source database server or the target database server encountering a commit statement for a unit of the batch job, suspend either the source database server or the target database server that encountered the commit statement;
program instructions to send a second communication, between the source database server and the target database server, to ask if either the source database server or the target database server is ready to complete the commit statement; and
program instructions to, responsive to either the source database server or the target database server confirming that either the source database server or the target database server is ready to complete the commit statement, complete the commit statement on both the source database server and the target database server.

24. The computer system of claim 23, further comprising:
program instructions to, responsive to encountering a lock conflict on either the source database server or the target database server, send a communication to either the source database server or the target database server that did not encounter the lock conflict to suspend operation.

* * * * *